June 12, 1962  A. ZALOUMIS  3,038,743
FLEXIBLE PIPE COUPLING WITH HEMISPHERICAL COUPLING ELEMENTS
Filed April 30, 1959
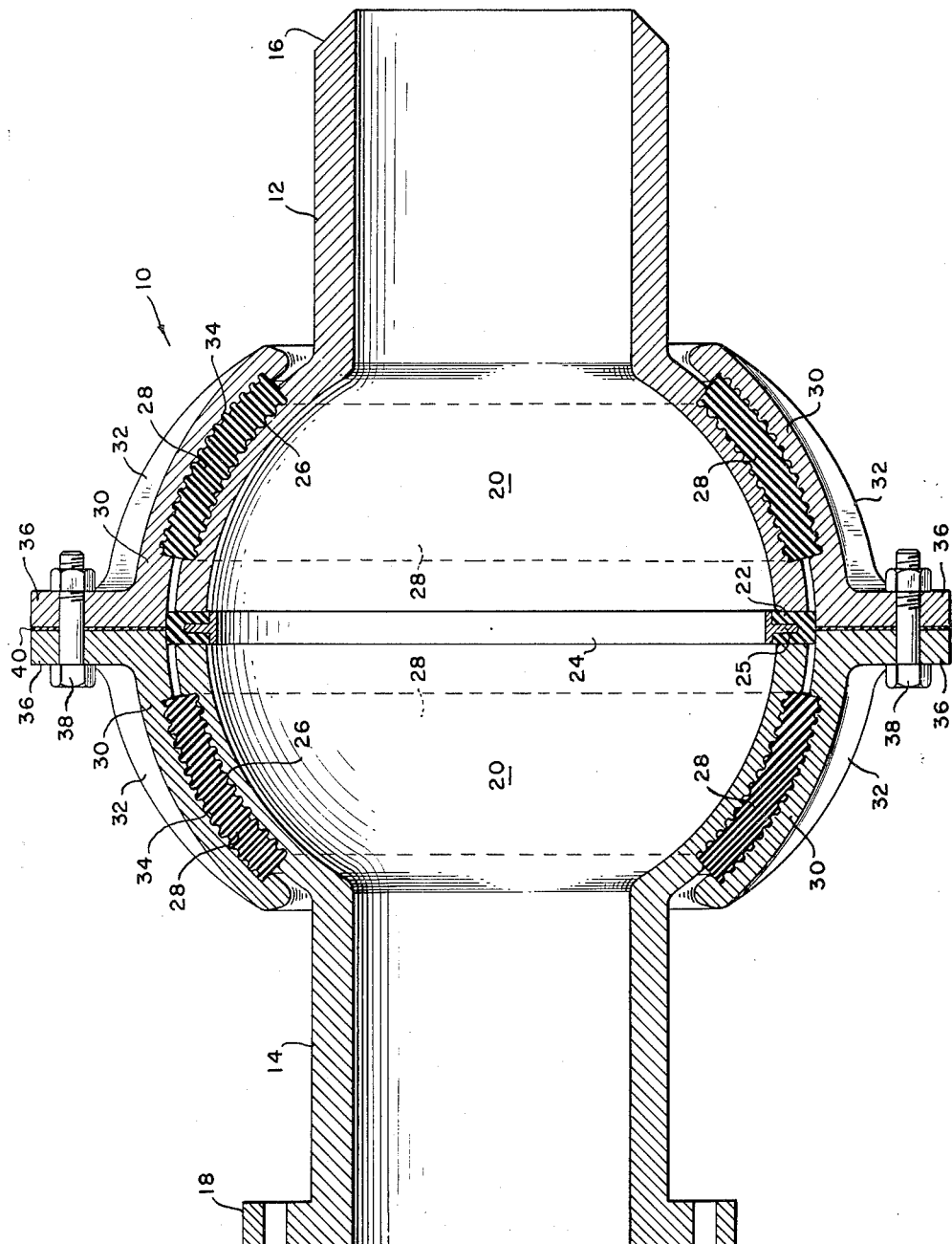
INVENTOR
ANGELOS ZALOUMIS
BY
ATTORNEYS 3,038,743
FLEXIBLE PIPE COUPLING WITH HEMI-
SPHERICAL COUPLING ELEMENTS
Angelos Zaloumis, 2420 Menokin Drive, Alexandria, Va.
Filed Apr. 30, 1959, Ser. No. 810,187
2 Claims. (Cl. 285—51)
(Granted under Title 35, U.S. Code (1952), sec. 266)

The invention described herein may be manufactured and used by or for the Government of the United States of America for governmental purposes without the payment of any royalties thereon or therefor.

This invention relates to a flexible pipe coupling and more particularly to a flexible pipe coupling adapted to reduce structureborne noise and at the same time provide a coupling means particularly adapted for use with large diameter pipes.

One prior art approach to the problem of flexibly connecting together a pair of pipe members has been the use of rubber hose, which in some cases are reinforced. Another approach has been the direct connection together of the end portions of adjacent pipe members by rigid metal members having certain types of resilient material interposed between the rigid members and the respective pipe members. While the use of rubber hose is satisfactory in small diameter, low pressure pipe applications, the use of rubber hose with high pressure, large diameter pipes has been found unsatisfactory due to poor strength qualities. Most other types of flexible pipe couplings have poor strength characteristics and in addition, are adapted to give in only one direction, namely longitudinally or in a direction parallel to the longitudinal axis of the adjacent pipe members. Thus most prior art flexible pipe couplings are not particularly adapted to compensate for lateral and/or angular deflection of the connected pipe members, and thus have not been found to be fully satisfactory.

In accordance with the instant invention a flexible pipe coupling is provided that is particularly adapted for use in connecting together pipes of large diameter, and also serves the function of reducing structureborne noise. The instant invention comprises a pair of coupling elements, each of which has a hemispherical section at one end thereof, the respective hemispherical portions being connected together in abutting relation to form a more or less spherical member. The hemispherical sections are clamped together in such a manner that they are adapted to move relative to one another angularly or laterally to compensate for either angular or lateral deflection of adjoining pipe elements. Thus the instant invention is particularly adapted for connecting together large diameter pipe members carrying fluids at high pressure and at the same time provides a means for isolating structureborne noise and additional means which compensates for either lateral or angular deflection on the part of the pipe members connected together by the instant coupling.

An object of this invention is to provide a coupling means adapted to overcome the inherent disadvantages of the prior art as cited above.

A further object of this invention is to provide a flexible pipe coupling adapted to isolate structureborne noise in a piping system.

Another object of this invention is to provide a flexible pipe coupling adapted to compensate for pipe deflections composed either individually or collectively of a longitudinal, lateral or angular nature.

Still another object of this invention is to provide a flexible pipe coupling particularly adapted to connect together large diameter pipes carrying fluids at high pressure, and at the same time isolate structureborne noise.

Still another object of this invention is to provide a flexible pipe coupling particularly adapted for use with large diameter pipes carrying fluids at high pressure, to isolate structureborne noise and to provide a means adapted to compensate for pipe deflections composed either individually or collectively of a longitudinal, lateral or angular nature.

Other objects and many of the attendant advantages of this invention will be readily appreciated as the same becomes better understood by reference to the following detailed description when considered in connection with the accompanying drawing which shows a sectional view of a symmetrical, flexible pipe coupling constructed in accordance with the instant invention.

Referring now to the drawing wherein like reference characters designate like or corresponding parts, there is shown in said drawing a flexible pipe coupling 10 constructed in accordance with the instant invention.

The coupling 10 comprises a pair of tubular members 12 and 14 adapted to be connected respectively to adjoining pipe line members either by welding of the beveled edge 16 on the tubular member 12 or by clamping with a flange 18 on the tubular member 14.

The innermost end of each of the tubular members 12 and 14 is provided with an outwardly flared, substantially hemispherical section 20. The hemispherical sections 20 are in juxtaposed relation with one another and are separated by a resilient ring 22 made of rubber or the like, which ring is abutted on its respective sides by the innermost edges of the respective hemispherical sections 20. The resilient ring 22 is provided with a rigid reinforcing ring 24 made of metal or the like and having a rib 25 on its outermost peripheral surface and extending entirely around the periphery thereof. The rib 25 is located within an annular groove formed in the innermost surface of the resilient ring 22.

Each of the hemispherical sections 20 is provided with a recessed area 26 extending peripherally of its outer surface. The bottom surface of the recessed area 26 is preferably corrugated or otherwise provided with an irregular surface for gripping purposes as hereinafter described. Each of the recessed areas 26 has therein a resilient, annular band 28 made of rubber or the like which has its innermost surface so shaped as to conform with the corrugated or roughened surface on the bottom of the recessed area 26. Each of the bands 28 is of a thickness more than twice that of the depth of the recessed areas 26 so that each band extends beyond the outer surface of the hemispherical section 20.

The coupling is held in assembled condition by a pair of connected, more or less hemispherical clamp elements 30 each of which is provided on its outermost surface, if desired, with reinforcing ribs 32. Each of the clamp elements 30 is provided with an annular recessed area 34 in its innermost surface in juxtaposed relation with the respective recessed areas 26 in the hemispherical sections 20. The bottom face of each of the recessed areas 34 is, like the bottom face of each of the recessed areas 26, provided with a serrated or corrugated surface. The recessed areas 34 are of such a width as to receive the outermost portion of the respective annular, resilient rings 28 and each is of such a depth that only a portion of each of the resilient rings 28 which extends beyond the outer surface of a hemispherical section 20 is located within the groove 34. The clamp elements 30 which are annular in shape, are each provided with an outwardly extending coupling flange 36, which coupling flanges are bolted together by a plurality of nut and bolt members 38. The abutting faces of the flanges 36 have interposed therebetween an annular gasket 40.

It is pointed out that the various elements are so proportioned that the outermost peripheral surface of the resilient ring 22 is in abutment with the inner surfaces of the respective coupling elements 30.

It is emphasized that fluid leakage from the instant coupling 10 is prevented, first by the ring 22, and in addition by the tight fit between the resilient annular bands 28 and the innermost surfaces of the grooves 26 and 34 respectively. Leakage is further prevented by the compressed gasket 40 between the coupling flanges 36.

It is emphasized that there is no metal to metal contact between any of the elements of the instant coupling 10, by virtue of which feature, transmission of structureborne noise is arrested, said noise being substantially absorbed by the resilient members 22 and 28, and the gasket 40. Furthermore, by virtue of the resilient connection between the hemispherical sections 20, and the clamp elements 30, said elements are permitted, when necessary, to move relative to one another in a longitudinal, lateral, and/or angular direction relative to one another. Angular movement of the tubular members 12 and 14 relative to one another is of course allowed by virtue of the ball and socket arrangement of elements 20 and 30 relative to one another.

Angular movement of either of the tubular elements 12 or 14 of course results in movement of one or more of the respective hemispherical sections 20 relative to the substantially hemispherical clamping elements 30, which movement is absorbed by compression of the resilient bands 28 between one edge of a groove 26 in a section 20, and a diagonally disposed edge of a groove 34 in a clamp element 30. Angular movement also results in compression of a portion of the annular resilient ring 22. Distortion of the resilient ring 22 is resisted by virtue of the presence of the rigid reinforcing ring 24.

Thus the instant invention provides a flexible pipe coupling of extremely sturdy construction that is particularly adapted for use with pipe lines of large diameter and more particularly those carrying fluids at high pressure. The resistance to rupture is provided by the clamp elements 30 acting to hold together the hemispherical sections 20, acting through the resilient bands 28, which bands in turn provide a noise isolation means and also a means for absorbing angular and/or lateral deflection of the tubular members 12 and 14 relative to one another. At the same time the bands 28, in conjunction with the gasket 40 provide a means for sealing the coupling against leakage. Thus the coupling is adapted to absorb angular and/or lateral deflection of pipe members connected thereto while at the same time being free from any danger of rupture and/or leakage.

It should be understood of course, that the foregoing disclosure relates to only a preferred embodiment of the invention and that numerous modifications or alterations may be made therein without departing from the spirit and scope of the invention as set forth in the appended claims.

What is claimed is:

1. A flexible pipe line coupling for interconnecting two sections of a pipe line, comprising, a first tubular member having a hemispherical coupling element at one end thereof and a second tubular member having a hemispherical coupling element at its end, said hemispherical coupling elements being in juxtaposed relation with one another, and each of said hemispherical elements having an annular, recessed area formed in its outer surface; a pair of clamp elements each of which conforms substantially to the outer contour of each of the hemispherical sections and is in surrounding relation therewith, means connecting together said clamp elements, each of said clamp elements having an annular recessed area formed in its innermost surface, in juxtaposition to the respective annular recessed areas in the hemispherical sections, a resilient, annular member interposed between the outer surface of each of the hemispherical sections and the inner surface of an adjacent, surrounding clamp element, and in surface contact with both, each of said resilient members having a portion thereof located within the recessed area formed in the outer surface of a hemispherical section and a portion thereof in the recessed area formed in the inner surface of a surrounding clamp element, each of said resilient annular members being of a thickness such that there is no metal to metal contact between a clamp element and the hemispherical section that it surrounds; a resilient annular gasket interposed between abutting clamped portions of said clamp elements; an annular, resilient means interposed between the juxtaposed hemispherical sections in abutting relation with both sections, said resilient annular members and said latter annular resilient means constituting means for preventing the transmission of structureborne noise by metal-to-metal contact between said sections of said pipe line, said latter annular resilient means having an annular slot formed therein at the inner periphery thereof, a rigid, annular, incompressible member having an outwardly extending rib on its outer periphery, said rib being located within the annular slot formed in the annular resilient member that is interposed between the juxtaposed hemispherical sections to provide a rigid support for said latter resilient member.

2. A flexible pipe line coupling as set forth in claim 1 wherein each of the annular recess in said hemispherical sections and said clamp elements respectively has a serrated bottom surface.

References Cited in the file of this patent

UNITED STATES PATENTS

| | | |
|---|---|---|
| 1,772,915 | Roseberg | Aug. 12, 1930 |
| 2,287,142 | Simmonds | June 23, 1942 |
| 2,462,592 | Bard | Feb. 22, 1949 |
| 2,468,924 | Courtier | May 3, 1949 |
| 2,562,359 | Iredell | July 31, 1951 |
| 2,688,500 | Scott | Sept. 7, 1954 |

FOREIGN PATENTS

| | | |
|---|---|---|
| 34,384 | Germany | July 12, 1885 |
| 443,317 | Great Britain | Feb. 26, 1936 |
| 1,061,950 | France | Dec. 2, 1953 |
| 928,384 | Germany | May 5, 1955 |